July 2, 1946.　　D. M. MacMILLAN ET AL　　2,402,968
COLORED GAS SIGNAL
Filed Aug. 15, 1942　　3 Sheets-Sheet 1
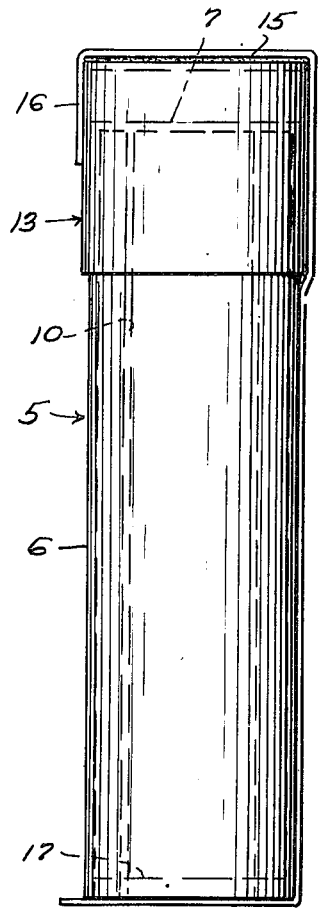
Fig. 1.
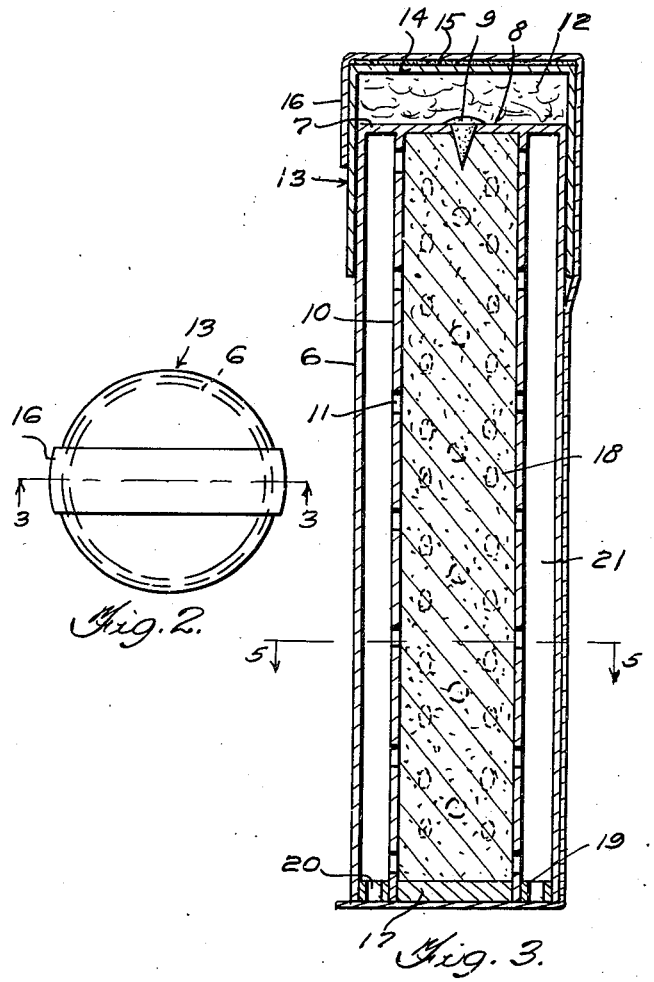
Fig. 2.
Fig. 3.
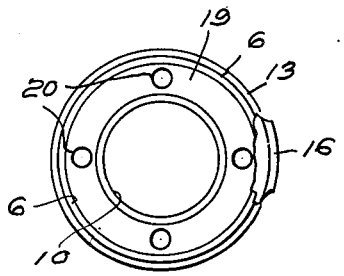
Fig. 4.
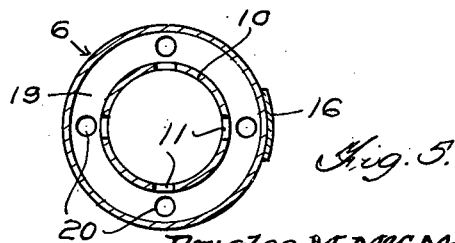
Fig. 5.
Inventor
Douglas M. MacMillan
John Vinton
By Clarence A. O'Brien
and Harvey B. Jacobson
Attorneys July 2, 1946.  D. M. MacMILLAN ET AL  2,402,968
COLORED GAS SIGNAL
Filed Aug. 15, 1942  3 Sheets-Sheet 2
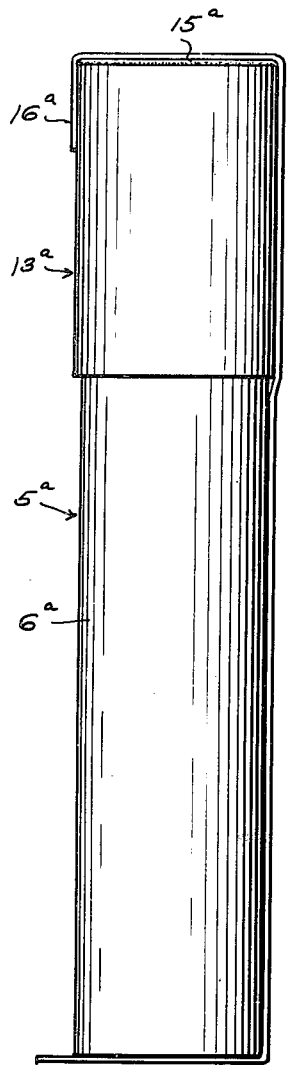
Fig. 6.
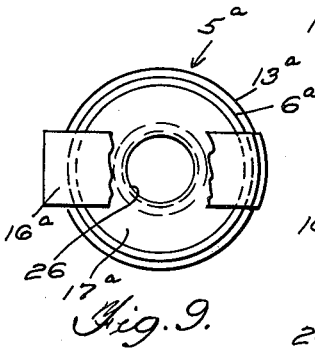
Fig. 7.
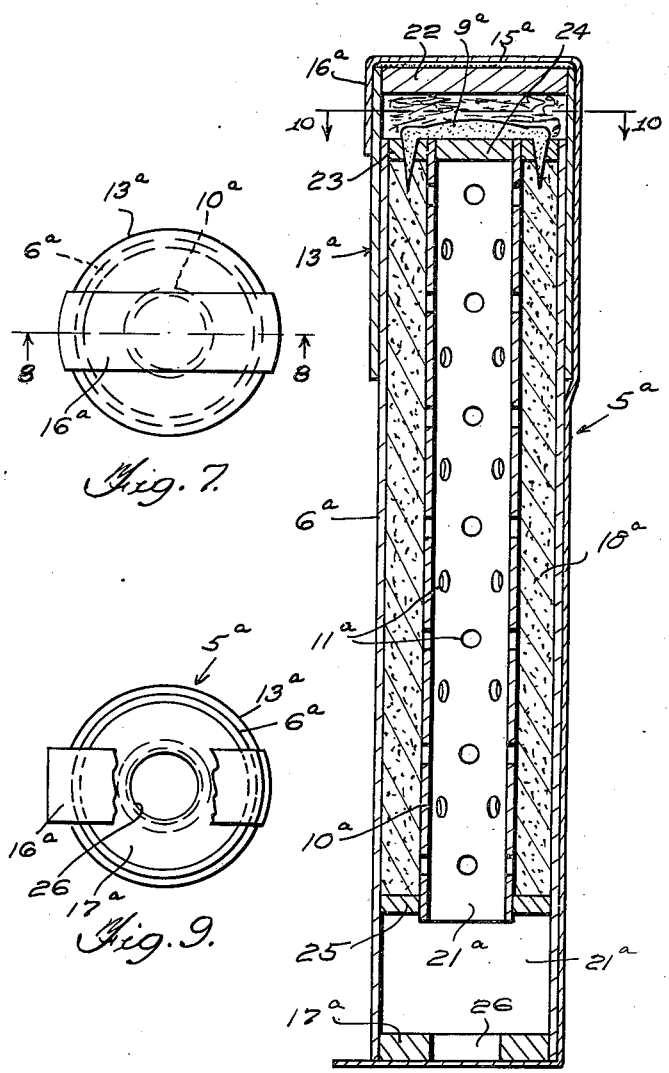
Fig. 8.
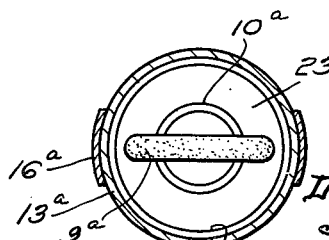
Fig. 10.
Fig. 9.
Inventor
Douglas M. MacMillan
John Vinton
By Clarence A. O'Brien
and Harvey B. Jacobson
Attorneys July 2, 1946.　　D. M. MacMILLAN ET AL　　2,402,968
COLORED GAS SIGNAL
Filed Aug. 15, 1942　　3 Sheets-Sheet 3

Inventor
Douglas M. MacMillan
John Vinton

By Clarence A. O'Brien
and Harvey B. Jacobson
Attorneys

Patented July 2, 1946

2,402,968

UNITED STATES PATENT OFFICE 2,402,968

COLORED GAS SIGNAL

Douglas M. MacMillan and John Vinton,
Berkeley, Calif.

Application August 15, 1942, Serial No. 455,000

3 Claims. (Cl. 102—37.8)

The invention relates to improved gas signal apparatus, and particularly to flares or fusees in which a gas smothering arrangement is incorporated to control the emission of the gas or smoke and prevent dissipation of the bright coloring of the gas or smoke, while emitting such gas or smoke into the atmosphere at a reduced temperature.

Other important objects and advantages of the invention will be apparent from a reading of the following description taken in connection with the appended drawings, wherein for purposes of illustration preferred embodiments of the invention are shown.

In the drawings:

Figure 1 is a general side elevational view of an embodiment of the invention involving an outside smothering chamber.

Figure 2 is a top plan view of Figure 1.

Figure 3 is a transverse vertical sectional view taken through Figure 2 along the line 3—3 and looking in the direction of the arrows.

Figure 4 is a bottom plan view of Figure 1.

Figure 5 is a horizontal sectional view taken through Figure 3 along the line 5—5 and looking downwardly in the direction of the arrows.

Figure 6 is a side elevational view of an embodiment of the invention involving an internal smothering cylinder.

Figure 7 is a top plan view of Figure 1.

Figure 8 is a transverse vertical sectional view taken through Figure 7 along the line 8—8 and looking in the direction of the arrows.

Figure 9 is a bottom plan view of Figure 6 with the sealing tape broken away to disclose the smoke or gas emitting opening.

Figure 10 is a horizontal sectional view taken through Figure 8 along the line 10—10 and looking downwardly in the direction of the arrows.

Figure 11:
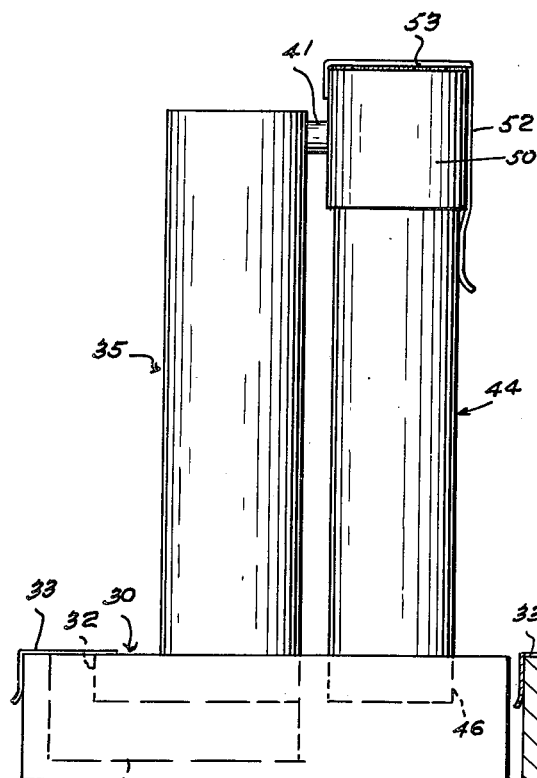
Figure 11 is a side elevational view of an embodiment of the invention in which a flare in accordance with the present invention is combined with an illuminating element on a common base, so that the smoke emitted by the flare is highly illuminated in the operation of the embodiment.

Referring in detail to the drawings, and first to the embodiment shown in Figures 1 through 5 the numeral 5 generally designates the gas or smoke flare which comprises an external cylinder 6 of suitable heat resisting material and which is closed at its upper end as indicated by the numeral 7 except for a centralized opening 8 in which is inserted a chemical friction igniter 9. Depending from the top 7 in concentrically spaced relation to the side walls of the cylinder 6 is the gas or smoke producing chemical containing cylinder 10 which reaches to the lower end of the outside cylinder 6 and has side wall perforations 11 distributed substantially throughout the length of the cylinder 10. Above the top 7 of the outer cylinder which forms also the top or the inner cylinder 10 is a mass 12 of cotton wadding or the like in protective relation to the friction igniter 9 and to the upper end of the assembled cylinders. A safety cap 13 is telescoped well onto the upper end of the cylinder 6 and has its top 14 in substantially spaced relation to the top 7. A transverse strip of friction material 15 is arranged on the upper surface of the cap top 14. A tape 16 is adhesively connected along opposite sides and across the top of the cap 13 in concealing and protective relation to the friction strip 15, and the tape runs along one side of the outer cylinder and across the lower end thereof as clearly indicated in Figures 1 and 3 of the drawings.

The interior of the cylindrical container 10 is filled with a colored smoke or gas generating composition such as a suitable colored aniline dye, cut with about 50% of a suitable fuel, such as dextrine or lactose and sawdust. This mixture is oxidized by a chlorate or a nitrate, in the proportion of about 25% of the total weight of the mixture.

For example:

| | Parts by weight |
|---|---|
| Aurimine yellow O | 10 |
| Dextrine | 10 |
| Sawdust | 1 |
| Oxidizer | 5 |

The foregoing formula produces a yellow smoke or gas. Other aniline dye may be used for other colors alone or in combinations.

The lower end of the iner cylinder 10 is closed by a disk 17 telescoped therein, and the perforations 11 are sealed with a chemical composition subject to flash or to melt upon ignition of the smoke or gas evolving composition 18. An annular closure 19 partly closes off the lower end of the outer cylinder 6 around the inner cylinder 10 and like the disk 17 is flush with the lower end of both cylinders. The annulus 19 is provided with circumferentially spaced smoke or gas emitting openings 20 through which the smoke or gas escapes to the atmosphere.

In operation, the cap 13 is removed, having first removed the tape 16, and the wadding 12 is then removed to expose the chemical friction igniter 9. The friction surface 15 is then rubbed against the igniter, and this is followed by ignition of the chemical contents 18 of the inner cylinder 10. In removing the tape 16 the portion across the lower end of the cylinders is also removed so as to fully expose the smoke or gas emitting openings 20. The annular chamber defined between inner cylinder 10 and the outer cylinder 6 comprises the smothering chamber 21 into which the smoke or gas generated by the combustion of the chemical substance 18 flows through the openings or perforations 11, therein to accumulate and to cool, before issuing in a controlled manner through the discharge openings 20 in the annulus 19, at a temperature reduced below that at which the uncontrolled gas or smoke would otherwise issue into the atmosphere. Such direct and uncontrolled issue of the gas or smoke into the atmosphere produces undesired changes therein which dissipate its color and brilliance, which is retained by the control arrangement described, in accordance with the present invention.

Referring now to the embodiment of the invention shown in Figures 6 through 10, the numeral 5a generally designates the flare, the numeral 6a designating the outer cylinder which is substantially the same as that described above, except that a somewhat longer cap 13a is used which includes a relatively heavy top 22, and wadding such as the wadding 12 of the first described embodiment of the invention is not used. The friction strip 15a on the upper side of the cap is protectively enclosed by a tape 16a as in the first described embodiment, the cap being retained by the attachment of the tape along both sides and across the top of the cap and the attachment of the tape along the side of the outer cylinder 6a and across the bottom as clearly shown in Figure 8 of the drawings.

In the present embodiment, instead of having an outside annular smothering chamber, the smothering chamber 21a is interiorly located and is comprised within the inner cylinder 10a which has side wall perforations 11a which are sealed with suitable readily fusible or chemical matter which will dissipate upon the ignition of the smoke or gas producing material. The said material, designated by the numeral 18a is in this embodiment located between the inner cylinder 10a and the outer cylinder 6a.

The inner cylinder 10a is supported in place by an annulus 23 which also closes the upper end of the space between the inner and outer cylinder, and the upper end of the inner cylinder is closed by a disk 24 which is inserted therein. A duplex igniter 9a extends across the disk 24 and projects downwardly through accommodating openings formed in the annulus 23 to make contact with the chemical mixture 18a. This chemical mixture is of the same type as described in connection with the first embodiment of the invention set forth herein.

The lower end of the inner cylinder 10a is spaced above the lower end of the outer cylinder 6a to a substantial degree as shown in Figure 8 of the drawings, the said lower end of the inner cylinder being open. The lower end of the space between the inner and outer cylinder is closed by an annulus 25 which also acts as a support for the lower end of the inner cylinder.

The lower end of the outer cylinder is closed by a disk 17a which has a relatively large axial colored smoke or gas emitting opening 26, the latter being closed by the lower portion of the sealing tape 16a. The space between the annulus 25 and the disk 17a constitutes the smothering chamber of this embodiment of the invention. As in the case of the first described embodiment use of the flare is made by removing the tape 16a and then scratching the igniter 9a with the friction surface 15a on the cap. This causes ignition of the chemical charge 18a which is then followed by destruction of the closures of the perforations 11a of the inner cylinder and production of colored gas or smoke within the inner cylinder 10a which is thereby conducted into the smothering chamber 21a from which its emission is controlled by the size of the opening 26. As in the case of the first described embodiment, the retardation of the escape of the colored gas or smoke until a substantial time has elapsed since its generation reduces the temperature of the colored smoke or gas and endows it with material resistance to deterioration upon being emitted into the atmosphere.

Figure 13:
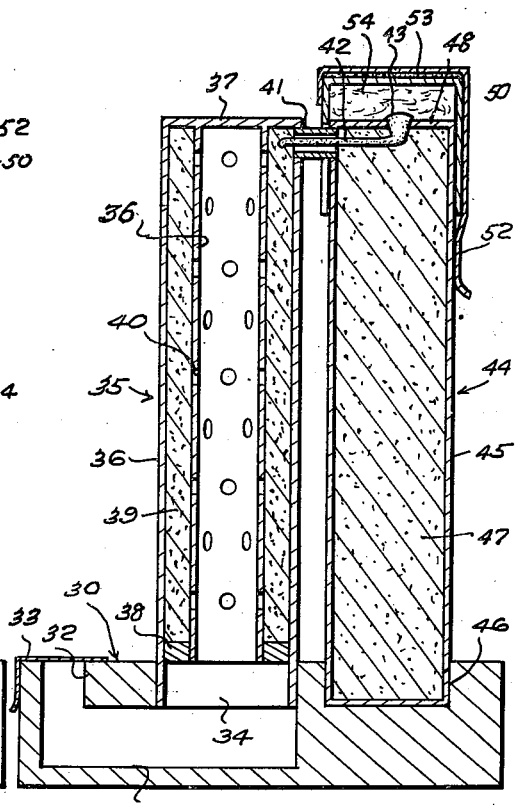
Figure 13 is a sectional view taken through Figure 12 along the line 13—13 and looking in the direction of the arrows.
Figure 12:
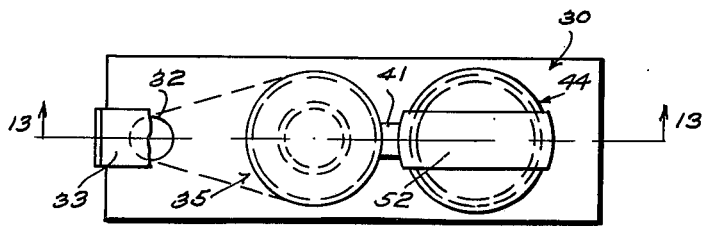
Figure 12 is a top plan view of Figure 11.

Referring now to the embodiment of the invention shown in Figures 11, 12 and 13 which in its broader aspect can be regarded as a combination of either of the above embodiments in active cooperation with an illuminating signal, the numeral 30 generally designates a suitable base preferably in an elongated rectangular form which is formed toward one end with a reclining L-shaped passage 31 whose upturned arm constitutes the colored smoke or gas emitting orifice 32, the same being closed by a removable tape 33. The relatively large circular opening 34 communicating with the reclining portion of the opening 31 has telescoped therein the lower end of the colored gas or smoke generating unit 35 which in this case comprises an external cylinder 36 which has a closed integral top 37 from which depends the inner cylinder 36 whose lower end extends as far as the top of the base 30. The lower end of the space between the inner and outer cylinders is closed by an annulus 38 and the said space is filled as indicated by the numeral 39 with the smoke or gas generating chemical. Perforations 40 which may be sealed with perishable substance adapted to be dissipated by combustion of the material 39 are formed the full length of the inner cylinder, the inner cylinder being open at its bottom in communication with the opening 34.

The uppper end of one side wall portion of the outer cylinder 36 is provided with a lateral tubular extension 41 through which leads an extension 42 of the igniter 43 of the illuminating component which is generally designated 44.

The illuminating component 44 is in the form of a cylinder 45 which is socketed as indicated by the numeral 46 in the top of the base 30 alongside of the smoke or gas generating component 35, the cylinder containing a filling 47 of any suitable illumination producing material.

The top 48 of the cylinder 45 has the igniter 43 situated therein and the tubular extension 41 communicates with the side wall of the cylinder in protective relation to the extension 42 of the igniter. The cylinder 45 has the cap 50 thereon similar to the caps already described and provided with a slot 51 to pass the tubular extension 41. An abbreviated tape 52 holds the cap in place on the cylinder 45 and shields the friction strip 53 on the upper surface of the cap. The cap encloses a protective body 54 of wadding or the like adapted to be removed upon removal of the cap to expose the igniter 43 for friction ignition by the friction surface 53 on the cap.

It will be obvious that the igniter 43 having been ignited the igniter will ignite both the illuminating charge 47 and the colored gas or smoke evolving charge 39. Thereupon the colored gas or smoke after passing through the smothering chamber constituted by the opening 34 and the passage 31 will issue from the discharge orifice 32 and be combined with the illuminating gas emitted by the illuminating unit 44.

Although there are shown and described herein preferred embodiments of the invention it is to be definitely understood that it is not desired to limit the application of the invention thereto except as may be required by the scope of the subjoined claims.

Having described the invention, what is claimed as new is:

1. A device for continuous emission of a stream of smoke of predetermined color consisting of an outer tube, a hollow inner tube open at one end and arranged substantially concentrically within said outer tube and spaced therefrom to provide a space, said outer tube extending beyond said inner tube at one end thereof to provide a smothering chamber for gas emitted from said inner tube, a smoke generating composition in said space adapted to burn when ignited at one end at a substantially constant rate to the other end thereof without flame and with emission of a substantially constant stream of a colored gaseous product, said inner tube having a plurality of side wall perforations therein throughout the length of said inner tube to release said generated colored gaseous product through that opening which is substantially at the point of gas generation and into said hollow inner tube for emission as a signal from the open end of said inner tube.

2. A device for continuous emission of a stream of smoke of predetermined color consisting of an outer tube having a first and a second end, a hollow inner tube having a first and a second end, said inner tube being open at its first end and arranged substantially concentrically within said outer tube and spaced therefrom to provide a space, the second end of each tube being adjacent each other, the first end of said outer tube extending beyond the first end of said inner tube to provide a smothering chamber for gas emitted from said first end of said inner tube, a smoke generating composition in said space adapted to burn when ignited adjacent the second ends of said tubes at a substantially constant rate to the other end thereof without flame and with emission of a substantially constant stream of a colored gaseous product, ignition means positioned at the adjacent second ends of said tubes to ignite said composition, said inner tube having a plurality of side wall perforations therein throughout the length of said inner tube to release said generated colored gaseous product through that opening which is substantially at the point of gas generation and into said hollow inner tube for emission as a signal from the open first end of said inner tube.

3. A device for continuous emission of a stream of smoke of predetermined color consisting of an outer tube having a first and a second end, a hollow inner tube having a first and a second end, said inner tube being open at its first end and arranged substantially concentrically within said outer tube and spaced therefrom to provide a space, the second end of each tube being adjacent each other, the first end of said outer tube extending beyond the first end of said inner tube, a closure member positioned at the second end of said outer tube and having an opening therein to provide a smothering chamber for gas emitted from said first end of said inner tube, a smoke generating composition in said space adapted to burn when ignited adjacent the second ends of said tubes at a substantially constant rate to the other end thereof without flame and with emission of a substantially constant stream of a colored gaseous product, ignition means positioned at the adjacent second ends of said tubes to ignite said composition, said inner tube having a plurality of side wall perforations therein throughout the length of said inner tube to release said generated colored gaseous product through that opening which is substantially at the point of gas generation and into said hollow inner tube for emission as a signal from the open first end of said inner tube.

DOUGLAS M. MacMILLAN.
JOHN VINTON.